(12) United States Patent
Obara et al.

(10) Patent No.: US 7,246,440 B2
(45) Date of Patent: Jul. 24, 2007

(54) SPINDLE MOTOR AND METHOD OF MANUFACTURING THE SAME

(75) Inventors: Rikuro Obara, Miyota-machi (JP); Kenji Fukunaga, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 840 days.

(21) Appl. No.: 10/614,212

(22) Filed: Jul. 8, 2003

(65) Prior Publication Data

US 2005/0028349 A1 Feb. 10, 2005

Related U.S. Application Data (63) Continuation of application No. 09/895,176, filed on Jul. 2, 2001, now abandoned.

(30) Foreign Application Priority Data

Jul. 21, 2000 (JP) ............................. 2000-220854

(51) Int. Cl.
*F16C 33/66* (2006.01)
*B21D 53/10* (2006.01)
*B21K 1/76* (2006.01)
*B23P 6/00* (2006.01)
*B23P 17/00* (2006.01)

(52) U.S. Cl. .................... 29/898.1; 29/898.09; 384/93; 310/90; 310/261; 360/99.08

(58) Field of Classification Search .................. 29/898, 29/898.1, 898.09, 898.064, 898.07, 722; 384/512, 513, 517, 93, 144, 142; 720/695; 360/99.01, 99.07, 99.08; 310/90, 156.01, 310/156.84, 261, 67 R
See application file for complete search history.

(56) References Cited

U.S. PATENT DOCUMENTS

| 3,557,807 | A | * | 1/1971 | Schipke .......................... 134/1 |
| 3,903,992 | A |   | 9/1975 | Chivukula et al. |
| 4,018,679 | A | * | 4/1977 | Bolsing ....................... 405/264 |
| 5,132,856 | A | * | 7/1992 | Takahashi ................ 360/99.08 |
| 5,336,955 | A |   | 8/1994 | Suzuki |
| 5,509,198 | A |   | 4/1996 | Takamizawa et al. |
| 5,547,291 | A |   | 8/1996 | Miyazaki et al. |
| 5,841,210 | A |   | 11/1998 | Obara |
| 5,880,543 | A |   | 3/1999 | Park |
| 5,925,955 | A | * | 7/1999 | Norris .......................... 310/90 |
| 5,932,941 | A | * | 8/1999 | Kinoshita et al. ............. 310/44 |
| 6,194,360 | B1 | * | 2/2001 | Karis et al. .................. 508/438 |

FOREIGN PATENT DOCUMENTS

| JP | A 3-261359 | 11/1991 |
| JP | A 8-275433 | 10/1996 |
| JP | A 10-143989 | 5/1998 |
| JP | A 10-174348 | 6/1998 |
| JP | A 11-51066 | 2/1999 |

* cited by examiner

*Primary Examiner*—David P. Bryant
*Assistant Examiner*—Alex Taousakis
(74) *Attorney, Agent, or Firm*—Oliff & Berridge, PLC (57) ABSTRACT

A spindle motor is formed so as to support a pivot of a rotor by a pair of open bearings.

The open bearings thus constructed will be less expensive and simple structures, so that a manufacturing cost thereof is reduced compared to a conventional spindle motor using a pair of ball bearings with shields. Accordingly, a low-cost spindle motor can be provided.

8 Claims, 8 Drawing Sheets

SPINDLE MOTOR AND METHOD OF MANUFACTURING THE SAME

BACKGROUND OF THE INVENTION

1. Field of the Invention

The present invention relates to a spindle motor and a method of manufacturing thereof and more particularly to a spindle motor for supporting a rotor using open ball bearings and a method of manufacturing thereof.

2. Description of the Related Art

Figure 5:
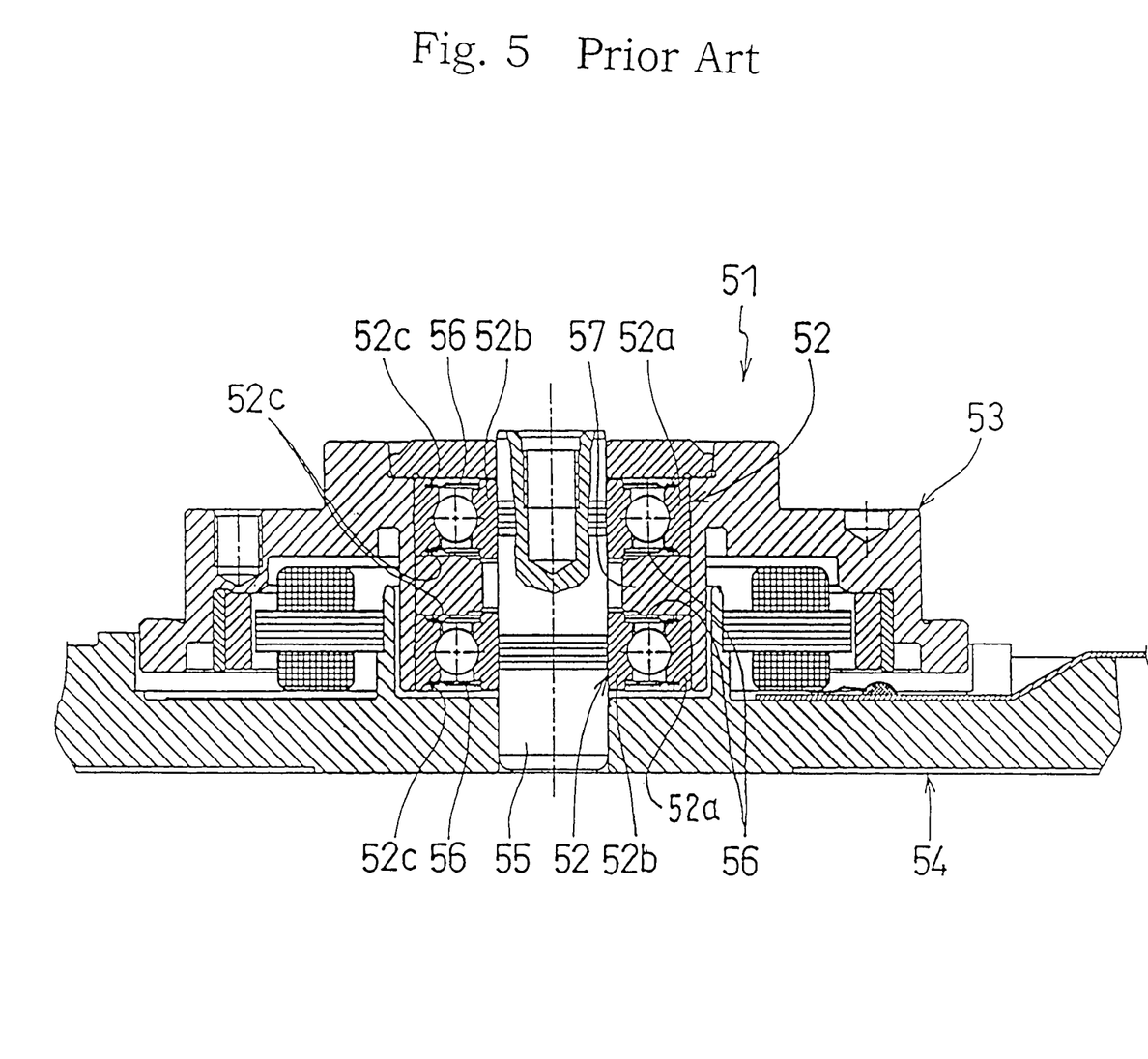
FIG. 5 is an explanatory view of a conventional spindle motor in which a pair of ball bearings with shields is disposed in a shaft fixed spindle motor.
Figure 6:
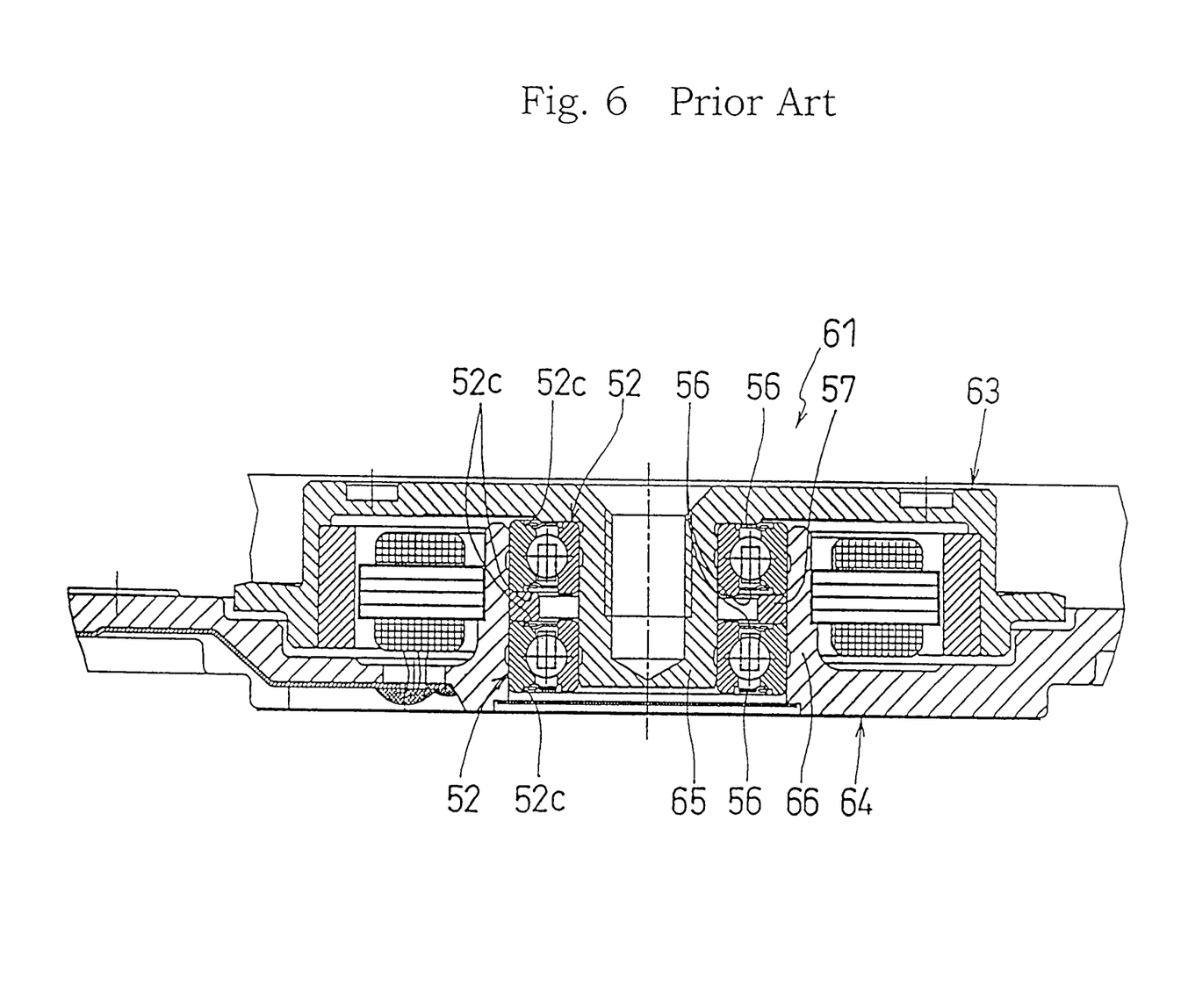
FIG. 6 is an explanatory view of the conventional spindle motor in which a pair of ball bearings with shields is disposed in a shaft rotatable spindle motor.

FIG. 5 shows one example of a spindle motor 51 for driving a hard disk drive device (hereinafter referred to as an HDD), more specifically, a shaft fixed spindle motor 51 wherein a shaft 55 is uprightly provided at the center of a base plate 54 and a rotor 53 is rotatably supported by interposing a pair of ball bearings 52 between the shaft 55 and the rotor 53. Further, FIG. 6 shows a shaft rotatable spindle motor 61 for an HDD wherein a substantially cylindrical fixed shaft 66 coaxial with a pivot 65 of a rotor 63 is uprightly provided and the rotor 63 is made to be rotatable by interposing a pair of ball bearings 52 between the fixed shaft 66 and the pivot 65 of the rotor 63. In general, the ball bearings 52 used for the spindle motors 51 and 61 are sealed ball bearings 52 both side surfaces of which are sealed by shields 56 so as to prevent grease from spilling out and also prevent foreign materials from entering as shown in FIGS. 5 and 6. Further, the shields 56 are arranged in grooves 52c consisted in both side surfaces of the ball bearings 52 (outer rings 52a and inner rings 52b) so as to not being protruded from the both side surfaces of the ball bearings 52. As shown in FIGS. 5 and 6, a pair of ball bearings 52 provided in the spindle motors 51 and 61 are disposed at prescribed intervals in the axial direction of the rotors 53 and 63 by interposing annular spacers 57 therebetween.

In recent years price competitions for hardware is intensified, and spindle motors for HDDs described above are not exceptional thereto. However, in the above-described ball bearings 51 and 61, the grooves 52c at both side surfaces of the outer rings 52a and the inner rings 52b are needed to be machined so that not only the cost of the ball bearings but also the one of the spindle motors 51 and 61 are increased accordingly. Then, open bearings without having shields 56 can be one of the choices because its relative cost will be less expensive, but open bearings without shields cannot be filled with grease in its assembly processes of the ball bearings due to the requirement of controlling the amount of grease as well as a pollution prevention before mounting into a machine. Moreover, open bearings are difficult to be maintained because foreign materials may enter the slide surfaces of the bearings before assembling the machine, resulting in numbers of difficulties when applying to the spindle motors 51 and 61.

SUMMARY OF THE INVENTION

Thus, the present invention is made in light of the above problems and an object thereof is to reduce manufacturing cost as well as to provide a spindle motor less expensive and a method of manufacturing thereof.

For the object described above, according to a first aspect of the present invention, there is provided a spindle motor for supporting a rotor by a pair of ball bearings, wherein a pair of ball bearings is open ball bearings of which both sides are open.

The spindle motor thus constituted is less expensive than a spindle motor using ball bearings with shields.

According to a second aspect of the present invention, there is provided a spindle motor, wherein a pair of open ball bearings is disposed in such a manner that extending parts formed in one side of outer rings or inner rings abut each other.

By thus constructed, a spacer provided between a pair of ball bearings will not be required, so that the manufacturing cost of the spindle motor can be reduced.

According to a third aspect of the present invention, there is provided a spindle motor, wherein a pair of open ball bearings is disposed in a shaft rotatable spindle motor wherein the inner rings rotate together with the rotor.

By thus constructed, the manufacturing cost of the spindle motor can be reduced compared to a shaft rotatable spindle motor using ball bearings with shields.

According to a fourth aspect of the present invention, there is provided a spindle motor, wherein a pair of open ball bearings is disposed in a shaft fixed spindle motor wherein the outer rings rotate together with the rotor.

By thus constructed, the manufacturing cost of the spindle motor can be reduced compared to a shaft fixed spindle motor using ball bearings with shields.

According to a fifth aspect of the present invention, there is provided a method of manufacturing a spindle motor for supporting a rotor by a pair of ball bearings, open ball bearings both sides of which are opened, the method comprising: a bearing washing process of washing the open ball bearings; a grease filling process of filling grease in the open ball bearings washed in the bearing washing process; and a bearing mounting process of mounting the open ball bearings filled with the grease in the grease filling process on the spindle motor; these processes being sequentially performed under a clean environment while assembling the spindle motor.

By thus constructed, the open ball bearings can be mounted on the spindle motor under a clean environment without foreign materials, etc. and the manufacturing cost of the spindle motor can be reduced compared to the spindle motor using the ball bearings with the shields.

BRIEF DESCRIPTION OF THE DRAWINGS

Other characteristics will be apparent in reference to the attached drawings.

DETAILED DESCRIPTION OF THE PREFERRED EMBODIMENTS

Figure 1:
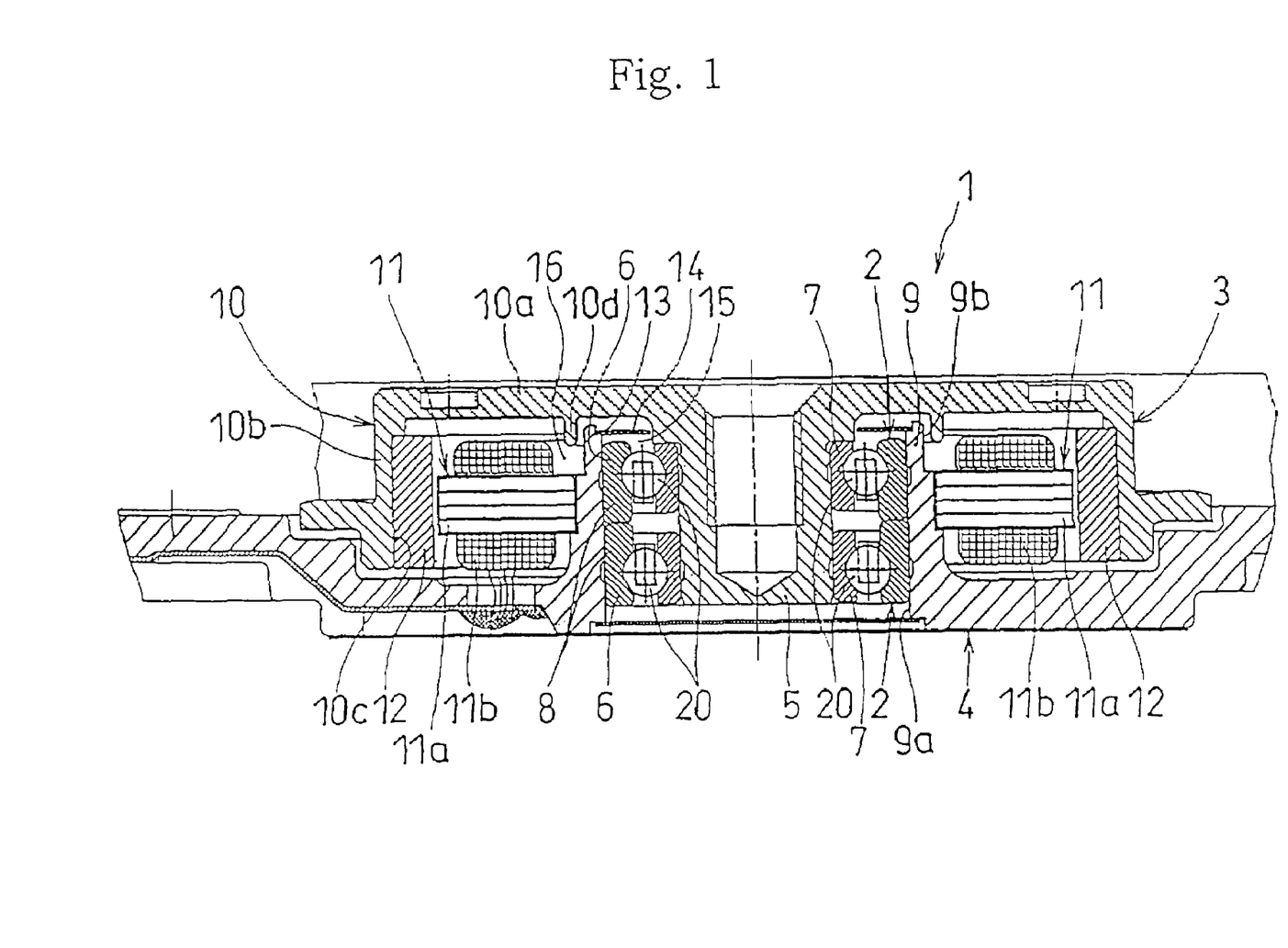
FIG. 1 is an explanatory view of a spindle motor according to a first embodiment in which a pair of open bearings is disposed in a shaft rotatable spindle motor.
Figure 7:
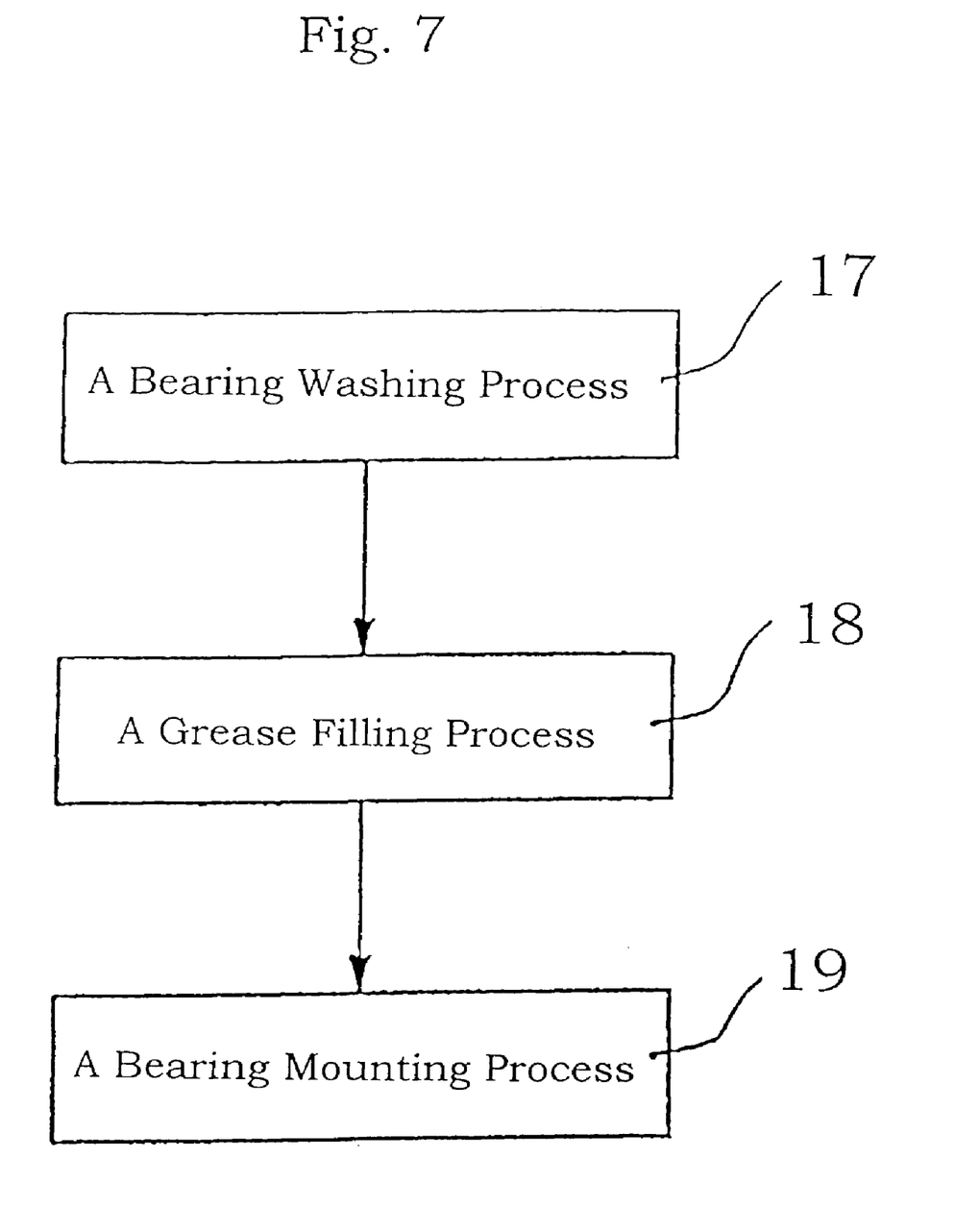
FIG. 7 is an explanatory view of a method of manufacturing the spindle motor according to the first embodiment.
Figure 8:
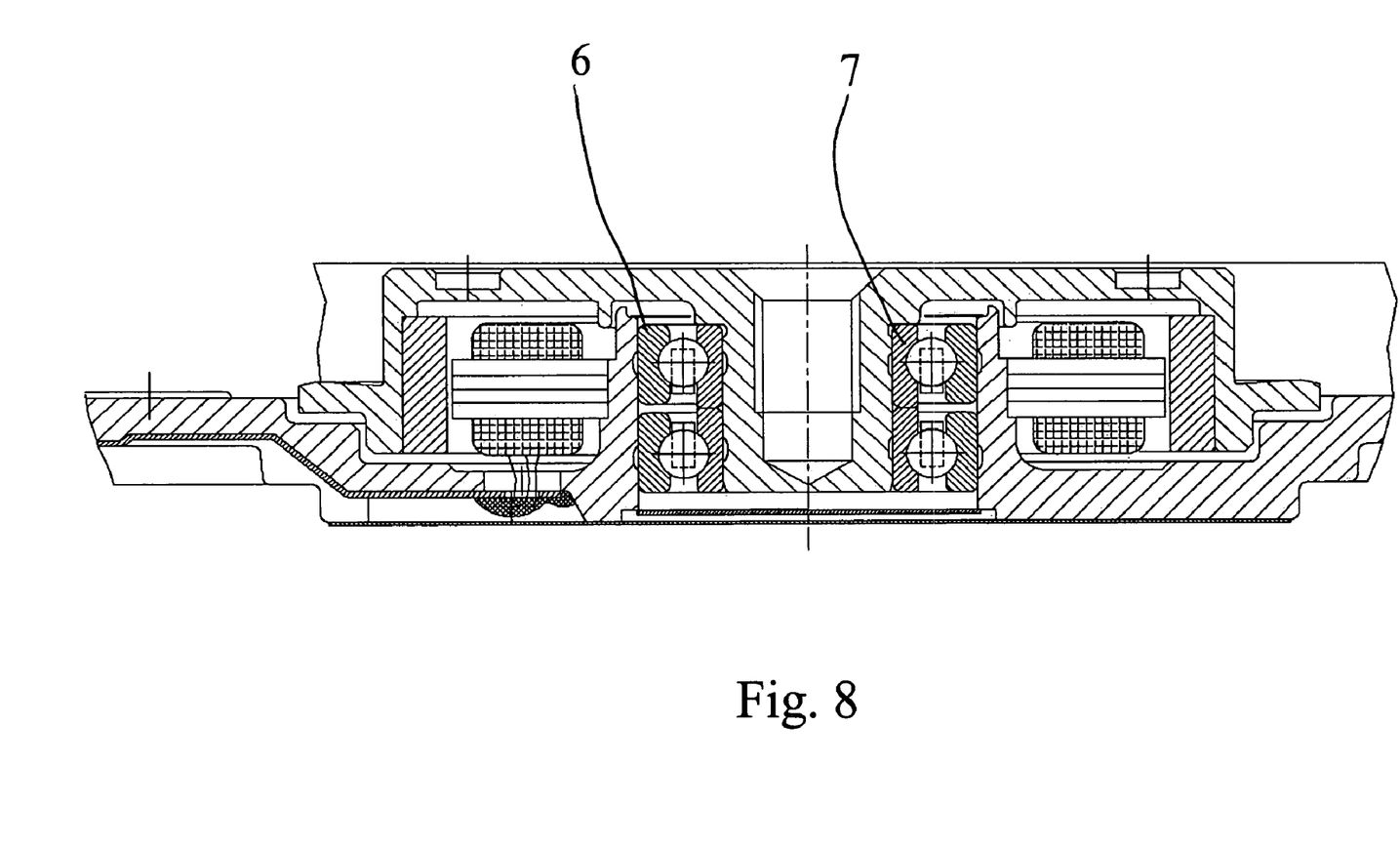
FIG. 8 is an explanatory view of the spindle motor according to another embodiment of the present invention.

A spindle motor according to a first embodiment of the present invention and a method of manufacturing thereof will be explained in reference to FIGS. 1 and 7. As shown in FIG. 1, a pivot 5 of a rotor 3 is supported by using a pair of open bearings 2, so that the manufacturing cost of a spindle motor 1 can be reduced compared to a conventional spindle motor 61 (see FIG. 6) using ball bearings 52 with shields. Further, as FIG. 1 shows, an extending part 8 formed by extending one side of each outer ring 6 (or inner ring 7, see FIG. 8) is provided in a pair of open bearings 2 and the pair of open bearings 2 are disposed in a shaft rotatable spindle motor 1 by abutting the extending parts 8 with each other. Thus, a spacer 57 (see FIG. 6) interposed between a pair of ball bearings 52 is not needed contrary to the conventional shaft rotatable spindle motor 61, thereby the manufacturing cost of the shaft rotatable spindle motor 1 is reduced while an assembly work is simplified. And, as FIG. 7 shows in the spindle motor 1 according to the first embodiment, the open bearings 2 can be mounted in the shaft rotatable spindle motor 1 by sequentially performing a bearing washing process 17, a grease filling process 18 and a bearing mounting process 19 in an assembly step of the spindle motor 1.

Now, the configuration of the spindle motor 1 will be described in detail. As FIG. 1 shows, the spindle motor 1 can be largely divided into a base member 4 and the rotor 3. The base member 4 is provided with a substantially cylindrical fixed shaft 9 coaxial with the rotor 3 (pivot 5) and uprightly provided. Moreover, the rotor 3 is provided with a hub 10 having an upright side wall 10b at the side edge 10a of a disk part 10a, and the pivot 5 is integrally formed with the hub 10. The spindle motor 1 according to the embodiment of the present invention is designed to rotatably support the rotor 3 by interposing a pair of open bearings 2 between the inner peripheral surface 9a of the fixed shaft 9 of the base member 4 and the pivot 5 of the rotor 3. As illustrated in FIG. 1, each pair of open bearings 2 has the extending part 8 at one side of the outer ring 6 and since a pair of open bearings 2 are disposed so as to abut their extending parts 8 each other, the spacer 57 (see FIG. 6) provided between a pair of ball bearings 52 becomes not necessary. Accordingly, the manufacturing cost of the spindle motor 1 can be reduced and the bearing mounting work can be simplified.

Further, as shown in FIG. 1, a stator 11 including a stator stack 11a and a coil 11b is fitted and fixed to the outer peripheral surface 9b of the fixed shaft 9 on the base member 4. A magnet 12 is disposed opposed to the stator 11 attached to the fixed shaft 9 of the base member 4 on the inner peripheral surface 10c of the hub 10 of the rotor 3. And, on the fixed shaft 9 of the base member 4, an annular shield member 14 is fitted and bonded to the surface of a step part 13 formed in the upper part of an inner peripheral surface 9a. In the spindle motor 1 according to the embodiment of the present invention, a labyrinth seal structure is formed at a small clearance between the inner diameter part of the shield member 14 and the outer diameter of the boss part of the pivot 5 and at a small clearance between the inner diameter part of the annular protrusion part 10d of the hub 10 and the outer peripheral surface 9b of the fixed shaft 9. Now, a method of manufacturing the above-described spindle motor 1, particularly, a method of mounting the open bearings 2 is hereinafter described with reference to FIG. 7.

(1) Bearing Washing Process

In an assembly of the spindle motor 1 the open bearings 2 are assembled setting steel balls 20 between the outer rings 6 and the inner rings 7 and then washed by a prescribed liquid through an ultrasonic cleaning method, etc., for removing excess grease or foreign materials remaining its surface.

(2) Grease Filling Process

And, the open bearings 2 washed in the bearing washing process 17 are filled with grease having a prescribed property with a grease filler device not shown.

(3) Bearing Mounting Process

Subsequently, the open bearings 2 filled with the grease in the grease filling process 18 are pressed in in such a manner that a pair of open bearings 2 are fixed to the inner peripheral surface 9a of the fixed shaft 9 of the base member 4 with the extending parts 8 abutted each other. Then, after the shield member 14 is attached to the step part 13 of the fixed shaft 9, the pivot 5 of the rotor 3 is fitted, preloaded and attached to the inner rings 7 of the pair of open bearings 2 fixed by the fixed shaft 9 to form the shaft rotatable spindle motor 1.

As described above, in the method of manufacturing the spindle motor 1 according to the first embodiment of the present invention, the bearing washing process 17, the grease filling process 18 and the bearing mounting process 19 are sequentially performed in a clean room when assembling the spindle motor 1 whereby a pair of open bearings 2 can be mounted on the shaft rotatable spindle motor 1 with few contamination.

Figure 2:
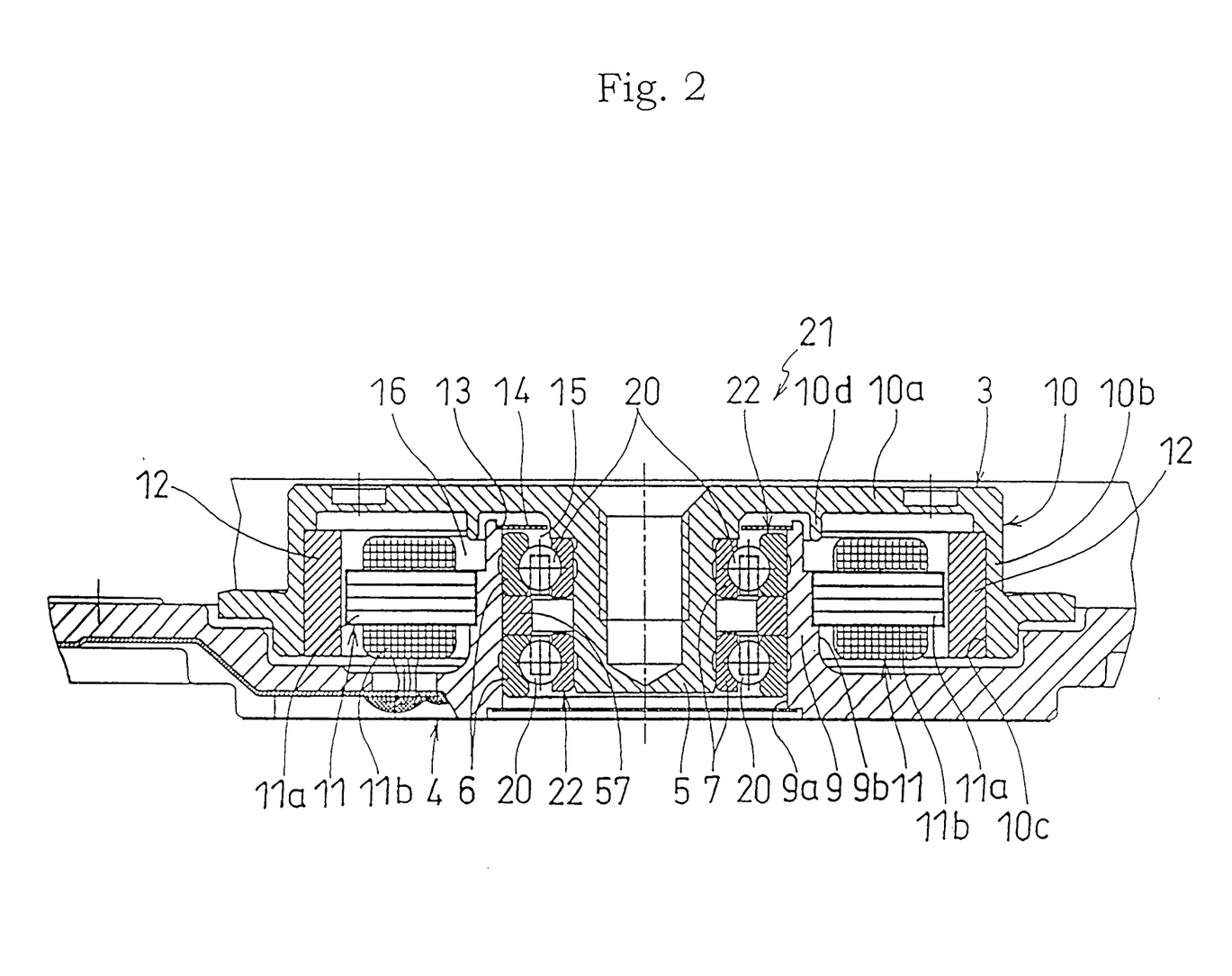
FIG. 2 is an explanatory view of the spindle motor according to the first embodiment in which a pair of open bearings is disposed in a shaft rotatable spindle motor by interposing spacers therebetween.

Noted that spacers 57 may be interposed between a pair of open bearings 2 as illustrated in FIG. 2 so as to form a shaft rotatable spindle motor 21 with general-purpose open bearings having no extending parts 8 in the outer rings 6.

Now, the spindle motor 1 according to the first embodiment of the present invention will be described in its function. In the spindle motor 1 of the present embodiment, the bearing washing process 17, the grease filling process 18 and the bearing mounting process 19 are sequentially performed when assembling the spindle motor 1 whereby a pair of open bearings 2 can be mounted on the shaft rotatable spindle motor 1 with few contamination. Therefore, there can be provided the spindle motor 1 less expensive compared to the conventional shaft rotatable spindle motor 61 (see FIG. 6) provided with the ball bearings 52 with the shields.

Further, the extending part 8 formed by extending one side of the outer ring 6 is provided in each of a pair of open bearings 2 and a pair of open bearings 2 is disposed in the spindle motor 1 with the extending parts 8 abutted each other. Accordingly, the spacer 57 (see FIG. 6) interposed between a pair of ball bearings 52 becomes not necessary resulting in that the manufacturing cost is reduced and the mounting work of the bearings is more simplified.

Figure 3:
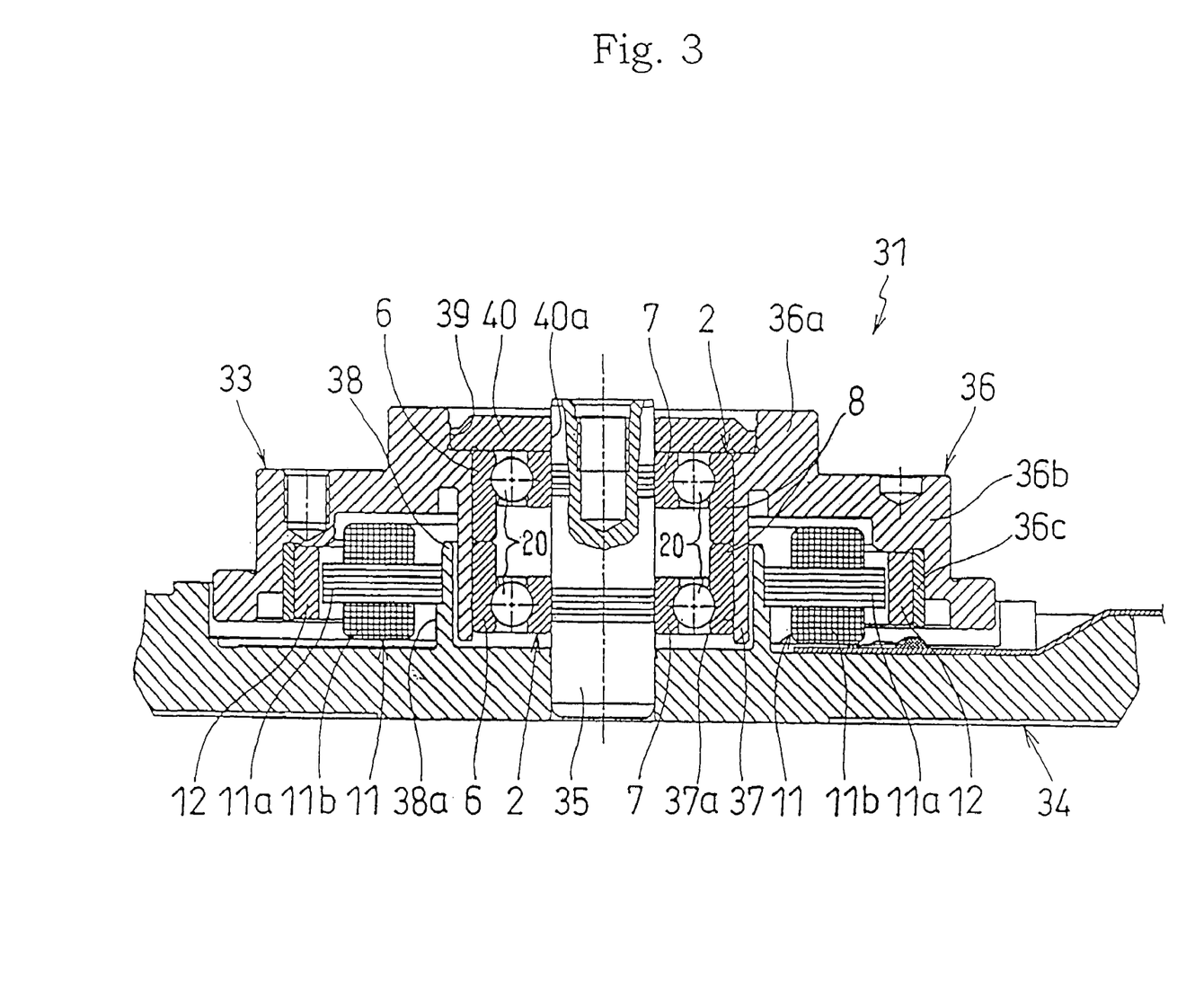
FIG. 3 is an explanatory view of a spindle motor according to a second embodiment in which a pair of open bearings is disposed in a shaft fixed spindle motor.

Now, a spindle motor according to a second embodiment of the present invention and a method of manufacturing thereof will be described with reference to FIGS. 3 and 7. For the same parts as those of the above-described spindle motor 1 and the method of manufacturing thereof, the same names and numerals are employed. First, the general structure of a spindle motor 31 according to a second embodiment will be described. As shown in FIG. 3, the rotor 33 of the shaft fixed type spindle motor 31 is supported by a pair of open bearings 2 whereby the manufacturing cost of the spindle motor is reduced compared to a conventional shaft fixed spindle motor 51 using a pair of ball bearings 52 with shields (see FIG. 5). Further, as shown in FIG. 3, an extending part 8 formed by extending one side of each outer ring 6 is provided in a pair of open bearings 2 and then the pair of open bearings 2 are disposed in the shaft fixed type spindle motor 31 with the extending parts 8 abutted each other. Thus, a spacer 57 (see FIG. 6) interposed between a pair of ball bearings 52 becomes not necessary so that the manufacturing cost is reduced and an assembly work is more simplified as compared to the conventional shaft fixed spindle motor 51 (see FIG. 5). Further, as shown in FIG. 7, in the spindle motor 31 in a second embodiment, the open bearings 2 can be mounted on the shaft rotatable spindle motor 31 by sequentially performing a bearing washing process 17, a grease filling process 18 and a bearing mounting process 19 in the assembly process of the spindle motor 31 similarly to the above described shaft rotatable spindle motor 1.

Now, the configuration of the spindle motor 31 according to the second embodiment will be described in detail. As shown in FIG. 3, the spindle motor 31 is largely divided into a base member 34 and the rotor 33. On the base member 34, a shaft 35 for supporting the rotor 33 is uprightly provided. Further, the rotor 33 is provided with a hub 36 having an upright side wall 36b on the side edge of a disk part 36a. The disk part 36a is provided with a cylindrical part 37 coaxial with the rotating shaft of the rotor 33. The spindle motor 31 according to the second embodiment is designed to rotatably support the rotor 33 by interposing a pair of open bearings 2 between the shaft 35 provided upright on the base member 34 and the inner peripheral surface 37a of the cylindrical part 37 of the rotor 33. As illustrated in FIG. 3, each of the pair of open bearings 2 has the extending part 8 in one side of the outer ring 6 and a pair of open bearings 2 are disposed with the extending parts 8 abutted each other. Accordingly, the spacer 57 (see FIG. 5) interposed between a pair of ball bearings 52 becomes not necessary, so that the manufacturing cost of the spindle motor 31 is reduced and the bearing mounting work is more simplified.

Further, as shown in FIG. 3, on the base member 34, an annular wall 38 is uprightly provided coaxially with the shaft 35 and a stator 11 composed of a stator stack 11a and a coil 11b is fitted and fixed to the outer peripheral surface 38a of the annular wall 38. On the inner peripheral surface 36c of the hub 36 of the rotor 33, a magnet 12 is provided opposed to the stator 11 attached to the annular wall 38 of the base member 34. Further, as shown in FIG. 3, a plate fitting hole 39 with a diameter larger than the inner diameter of the cylindrical part 37 is formed aside at the cylindrical part 37 provided in the hub 36. A substantially disk-shaped plate 40 with a hole 40a through which the shaft 35 passes through in a very small clearance is fitted, bonded and fixed to the plate fitting hole 39.

In a method of manufacturing the spindle motor 31 according to the second embodiment, a pair of open bearings 2 can be mounted on the shaft fixed spindle motor 31 in the same manner as the above described shaft rotatable spindle motor 1 by sequentially performing the bearing washing process 17, the grease filling process 18 and the bearing mounting process 19 when assembling the spindle motor 31.

Figure 4:
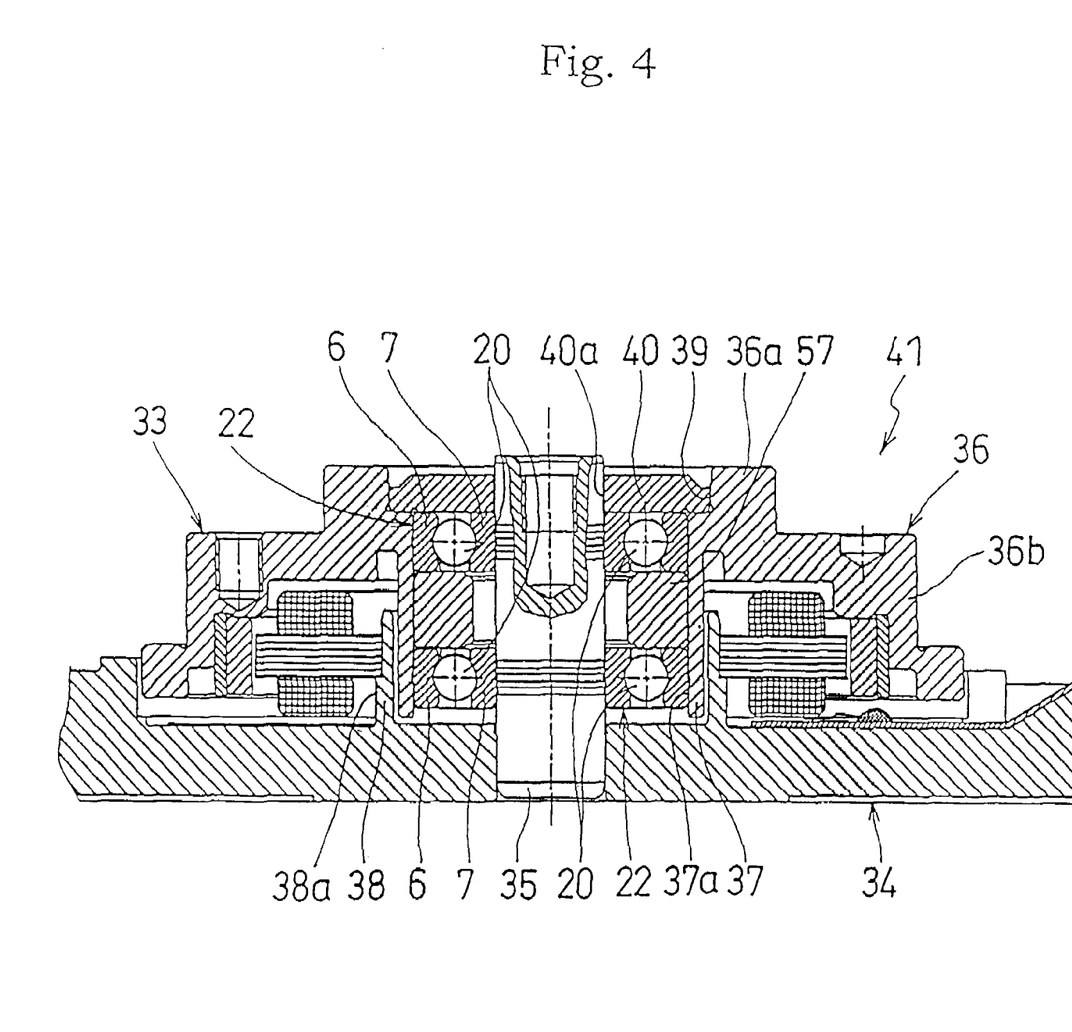
FIG. 4 is an explanatory view of the spindle motor according to the second embodiment in which a pair of open bearings is disposed in the shaft fixed spindle motor by interposing spacers therebetween.

Noted that a spacer 57 may be interposed between a pair of open bearings 2 as illustrated in FIG. 4 so as to form a shaft fixed spindle motor 41 with general-purpose open bearings 22 having no extending parts 8 in the outer rings 6.

Now, the spindle motor 31 according to the second embodiment of the present invention will be described in its function. In the spindle motor 31 of the present embodiment, a bearing washing process 17, a grease filling process 18 and a bearing mounting process 19 are sequentially performed in the assembly process of the spindle motor 31. Therefore, a pair of open bearings 2 can be mounted on the shaft fixed spindle motor 31 with few contamination whereby the manufacturing cost of the spindle motor 31 is reduced compared to the conventional shaft fixed spindle motor 51 (see FIG. 5) provided with the ball bearings 52 with the shields.

Further, the extending part 8 formed by extending one side of the outer ring 6 is provided in each of a pair of open bearings 2 and a pair of open bearings 2 are disposed in the spindle motor 31 with the extending parts 8 abutted each other. Therefore, the spacer 57 (see FIG. 5) interposed between a pair of ball bearings 52 becomes not necessary whereby the manufacturing cost is reduced and the mounting work of the bearings is more simplified.

According to the first aspect of the present invention, since a rotor is supported with open bearings less expensive compared to the conventional ball bearings with shields, the manufacturing cost of the spindle motor is reduced.

According to the second aspect of the present invention, since a pair of open bearings is disposed in a spindle motor in such a manner that extending parts formed in one side of each outer ring are abutted each other, a spacer interposed between a pair of open bearings becomes not necessary whereby the manufacturing cost of the spindle motor is reduced and the mounting work of the bearings is more simplified.

According to the third aspect of the present invention, since a pair of open bearings is disposed in a shaft rotatable spindle motor, the manufacturing cost of a shaft rotatable spindle motor is reduced compared to a spindle motor wherein a rotor is supported by ball bearings with shields.

According to the fourth aspect of the present invention, since a pair of open bearings is disposed in a shaft fixed spindle motor, the manufacturing cost of the shaft fixed type spindle motor is reduced compared to a spindle motor wherein a rotor is supported by ball bearings with shields.

And, according to the fifth aspect of the present invention, since a spindle motor is formed by sequentially performing a bearing washing process, a grease filling process and a bearing mounting process when being assembled, a pair of open ball bearings can be mounted in the spindle motor; moreover, the spindle motor can be formed less expensively compared to a spindle motor wherein a rotor is supported by ball bearings with shields.

What is claimed is:

1. A method of manufacturing a spindle motor for supporting a rotor by a pair of ball bearings, said ball bearings being open ball bearings both sides of which are open, said method comprising:
    a bearing washing process of cleaning said open ball bearings;
    a grease filling process of filling grease in said open ball bearings cleaned in said bearing washing process; and
    a bearing mounting process of mounting said open ball bearings filled with the grease in said grease filling process on said spindle motor;
    wherein the bearing washing process, the grease filling process and the bearing mounting process are sequentially performed in an assembly process of said spindle motor under a clean environment.

2. The method of claim 1, the bearing washing process comprising:
   setting steel balls between outer rings and inner rings of the ball bearings; and
   washing the ball bearings through ultrasonic cleaning.

3. The method of claim 1, wherein an extending part is formed on an outer ring or an inner ring of each of the pair of ball bearings,
   the bearing mounting process comprising abutting the extending parts of the ball bearings with each other.

4. The method of claim 1, the bearing mounting process comprising mounting the pair of open ball bearings in a shaft rotatable spindle motor in which inner rings of the ball bearings rotate together with a rotor of the spindle motor.

5. The method of claim 4, the bearing mounting process further comprising attaching a shield member to a shaft of the spindle motor.

6. The method of claim 5, the bearing mounting process further comprising providing a labyrinth structure at an edge of the shield member.

7. The method of claim 1, the bearing mounting process comprising mounting the ball bearings in a shaft fixed spindle motor in which outer rings of the ball bearings rotate together with a rotor of the spindle motor.

8. The method of claim 7, the bearing mounting process further comprising attaching a shield member to the rotor.

* * * * *